United States Patent [19]
Willkop et al.

[11] Patent Number: 4,719,747
[45] Date of Patent: Jan. 19, 1988

[54] APPARATUS FOR OPTIMIZING THE BLADE AND SEALING SLOTS OF A COMPRESSOR OF A GAS TURBINE

[75] Inventors: Franz Willkop, Munich; Gerhard Zaehring, Woerthsee; Joachim Popp, Dachau; Robert Ruetsch, Karlsfed, all of Fed. Rep. of Germany

[73] Assignee: MTU Motorern-und Turbinen-Union Munchen GmbH, Munich, Fed. Rep. of Germany

[21] Appl. No.: 758,049

[22] Filed: Jul. 23, 1985

[30] Foreign Application Priority Data

Aug. 4, 1984 [DE] Fed. Rep. of Germany ....... 3428892

[51] Int. Cl.$^4$ .......................... F02C 6/18; F02G 3/00
[52] U.S. Cl. ..................... 60/39.07; 60/726; 60/728; 415/115; 415/176
[58] Field of Search ............. 60/726, 727, 728, 39.07; 415/115, 116, 108, 175, 176, 134, 168

[56] References Cited

U.S. PATENT DOCUMENTS

| | | | |
|---|---|---|---|
| 2,848,156 | 8/1958 | Oppenheimer | 415/108 |
| 3,031,132 | 4/1962 | Davies | 415/115 |
| 3,742,706 | 7/1973 | Klompas | 415/115 |
| 3,844,110 | 10/1974 | Widlanski et al. | 60/726 |
| 4,329,114 | 5/1982 | Johnston et al. | 415/116 |
| 4,337,016 | 6/1982 | Chaplin | 415/116 |
| 4,338,061 | 7/1982 | Beitler et al. | 415/175 |
| 4,554,789 | 11/1985 | Napoli et al. | 415/176 |
| 4,576,547 | 3/1986 | Weiner et al. | 60/726 |
| 4,657,482 | 4/1987 | Neal | 60/39.07 |

FOREIGN PATENT DOCUMENTS

112317 9/1978 Japan ..................... 60/726

OTHER PUBLICATIONS

*Interavia*, Feb. 1983, p. 102, Middle col., Last Paragraph, "Industrie".

Primary Examiner—Louis J. Casaregola
Assistant Examiner—Donald E. Stout
Attorney, Agent, or Firm—Roberts, Spiecens & Cohen

[57] ABSTRACT

An apparatus for optimizing blade and sealing slots of a compressor of a gas turbine comprising a rotor including a plurality of axially spaced discs and rotor blades on the discs and a stator casing surrounding the blades and forming clearance slots therewith. The blades and stator casing form a path for flow of air in a main stream in which the air is compressed and discharged at a discharge end of the compressor. A seal at the last of the discs opposes outflow of compressed air thereat and forms sealing slots through which leakage air can flow from the main stream. The leakage air is conveyed from the compressor and a portion thereof is diverted as a secondary stream in a direction opposite the main stream of air flow in the compressor, and discharged towards the last rotor disc and at least the next adjacent rotor disc to flow thereon.

16 Claims, 5 Drawing Figures

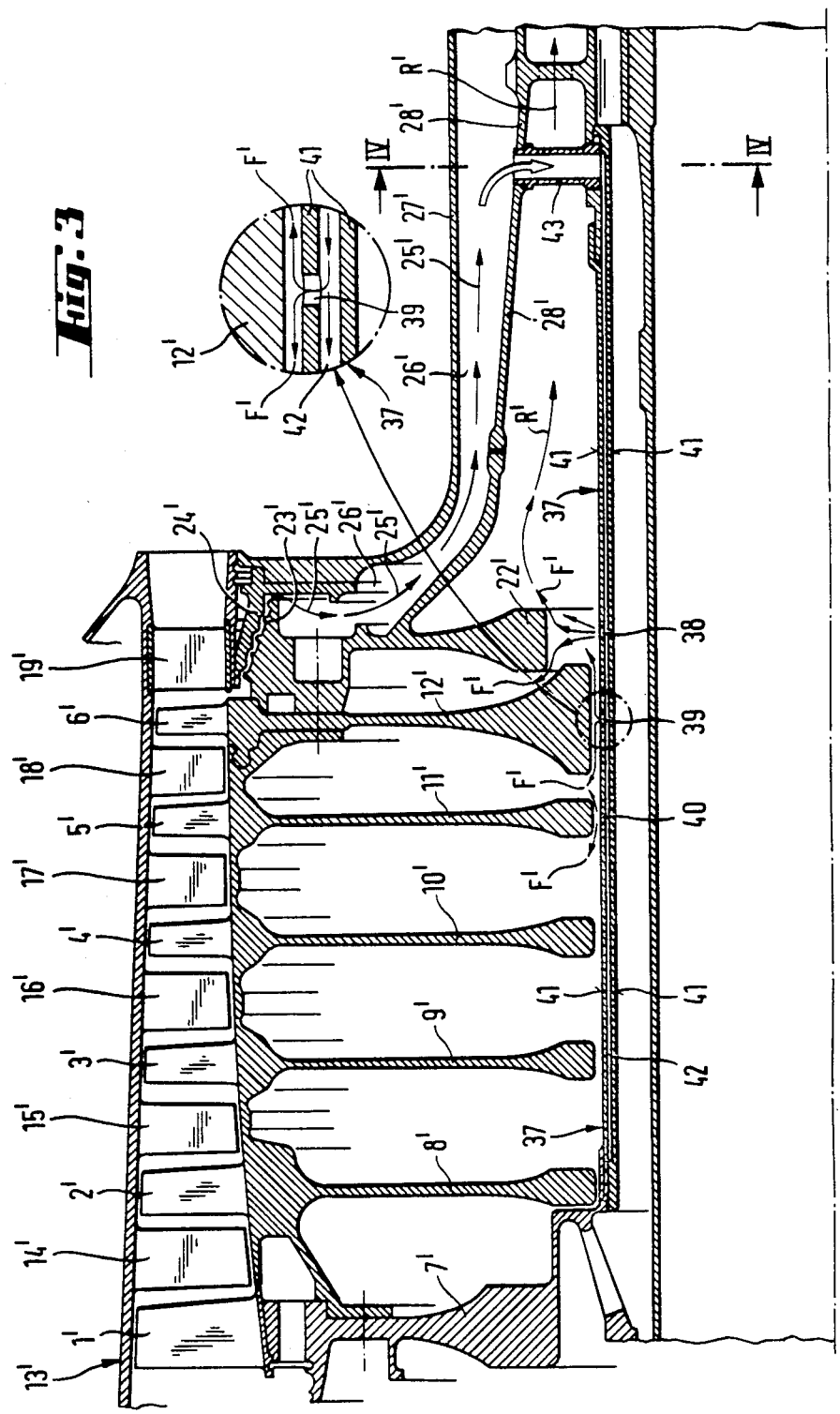

APPARATUS FOR OPTIMIZING THE BLADE AND SEALING SLOTS OF A COMPRESSOR OF A GAS TURBINE

FIELD OF THE INVENTION

The invention relates to apparatus for optimizing the blade and sealing slots of a compressor of a gas turbine engine, particularly, a gas turbine jet engine.

BACKGROUND AND PRIOR ART

The rotors and casings of flow engines (for instance, steam turbines, compressors, gas turbines) are generally designed on the basis of strength and/or weight, and housings of relatively small mass are opposite rotors of relatively high mass. The following characteristics result from this:

an optimal clearance of, for instance, a few hundredths of a millimeter can be provided for the radial, rotating and stationary guide blades only for a specific load condition. Other load conditions must be carried out with radial slot sizes which result from the above optimizing design. Namely, not only are there variations in size depending on load conditions, but also for cold slots and in the thermal transition behavior of the rotor and stator between two different loading conditions;

in the event of excessive differences in the thermal transition behavior it may be necessary to make the "optimum" radial slot larger in order to avoid, in certain transient conditions, a radial scraping of the rotating and guide blades with their respective opposed structure;

the above is also important in the construction and sizing of the slots of radial seals.

As a result of conventional construction, there are a number of disadvantages as noted hereafter:

loss of power and efficiency, or increased consumption of fuel for load conditions which differ from that for which the slot sizes were optionally designed;

loss of power and efficiency, or increased consumption of fuel during transition states or non-steady operating conditions;

suceptibility to compressor pumping, particularly upon acceleration.

In order to provide a margin of safety in light of the varying conditions, it is known from U.S. Pat. No. 4,329,114 to provide a radial slot control device, which is adjustable as a function of engine output parameters, for compressors of gas turbine engines. In the patent there is disclosed a construction in which air taken from a relatively "cold" region of the compressor is selectively diverted, by a flap control valve on the outer casing, to flow either in entirety or in part along the outside of the corresponding inner guide blade support structure, and therefore over an axial length from the region of air removal approximately to the last compressor stage.

In another system for controlling the clearance between blades and opposite structure for compressors of gas turbine engines, U.S. Pat. No. 4,338,061 shows a system operating predominantly electronically and including a mechanical control valve by which relatively cold air is bled for turbine cooling or control of internal leakage. The cold air is bled from a comparatively early compressor stage, for instance from the fifth compressor stage as a by pass flow mainly for control of size of the radial slot due to blade clearance. In this regard, the bleed point communicates both with an outer first flow path extending along the compressor housing up to the last compressor stage and with a second flow path extending parallel to the latter. The mechanical control valve controls a variable passage of air through both flow paths and thus provides cooling of variable intensity of the outer housing. The optimal position of the control valve for the specific operating condition is representative of the size of the radial slot actually required at the time, as calculated by a computer system, using pertinent engine parameters based on the difference between the actual temperature and the desired temperature of the housing as predetermined for the condition of particular operation.

The following disadvantages result from the systems of the two U.S. Patents described above:

an expensive electronic construction is required;
expensive air guides and control means are required;
a comparatively large increase in weight is obtained by the added structure;
a larger engine diameter is required, particularly in the region of the compressor;
it is necessary to tap off comparatively large amounts of compressed air which compromises the compression;
as a whole, considerable susceptibility to turbulence is produced.

From the journal "INTERAVIA," 2 (February), 1983, page 102, middle column, last paragraph, there is known, by itself, a so-called "active" slot control for the compressor of a gas-turbine engine by introduction of hot air into the corresponding compressor rotor.

SUMMARY OF THE INVENTION

An object of the present invention is to provide an apparatus which substantially eliminates the disadvantages resulting from the apparatus of the cited U.S. Patents and to provide optimization of the sizing of the blade and sealing slots by introducing hot air into the compressor rotor with comparatively minimal structural requirement and expense and without causing any substantial losses in output in the work cycle of the engine.

The above and further objects of the invention are attained by diverting a portion of the leakage air which flows through the main seal at the last of the rotor discs, as a secondary stream flowing in a direction opposite the main stream of air flow in the compressor, and directing the secondary stream into the rotor towards the last rotor disc and, at least, the next adjacent rotor disc to equalize the temperature of the discs therethroughout and substantially preserve the sizes of the blade and sealing slots whereby the slots can be optimally designed for a particular condition and substantially maintained for changing conditions.

By virtue of the invention, it is possible to utilize the leakage air between the rotor and stator of the compressor to obtain optimal slot sizing even under non-uniform operating conditions. In particular, the invention provides that the temperatures of the rotor support discs can be approximated to that of the compressor housing or casing and these temperatures can be rapidly adapted to the air temperatures under new or changed load conditions.

According to the invention, the following features are obtained:

the temperature variation in the rotor disc upon change of load conditions is reduced and;

the stresses in the discs under transient and changing load conditions can be lowered. Furthermore, the life of the disc can be increased or, alternatively, the discs can be reduced in thickness and weight.

All of the above can be achieved without any expense of additional regulating and control operations.

In accordance with a particular feature of the invention, the secondary stream of leakage air is divided into a plurality of further streams, each of which is directed against a respective disc preferably at the location where each disc has its greatest mass. This has the effect of substantially minimizing thermal time lag of the discs in relation to the outer structural regions of the compressor to maintain the optimal sizes of the blade and sealing slots.

BRIEF DESCRIPTION OF THE SEVERAL VIEWS OF THE DRAWING

FIG. 3 is similar to FIG. 1 but with another embodiment of the invention.

DETAILED DESCRIPTION

Figure 1:
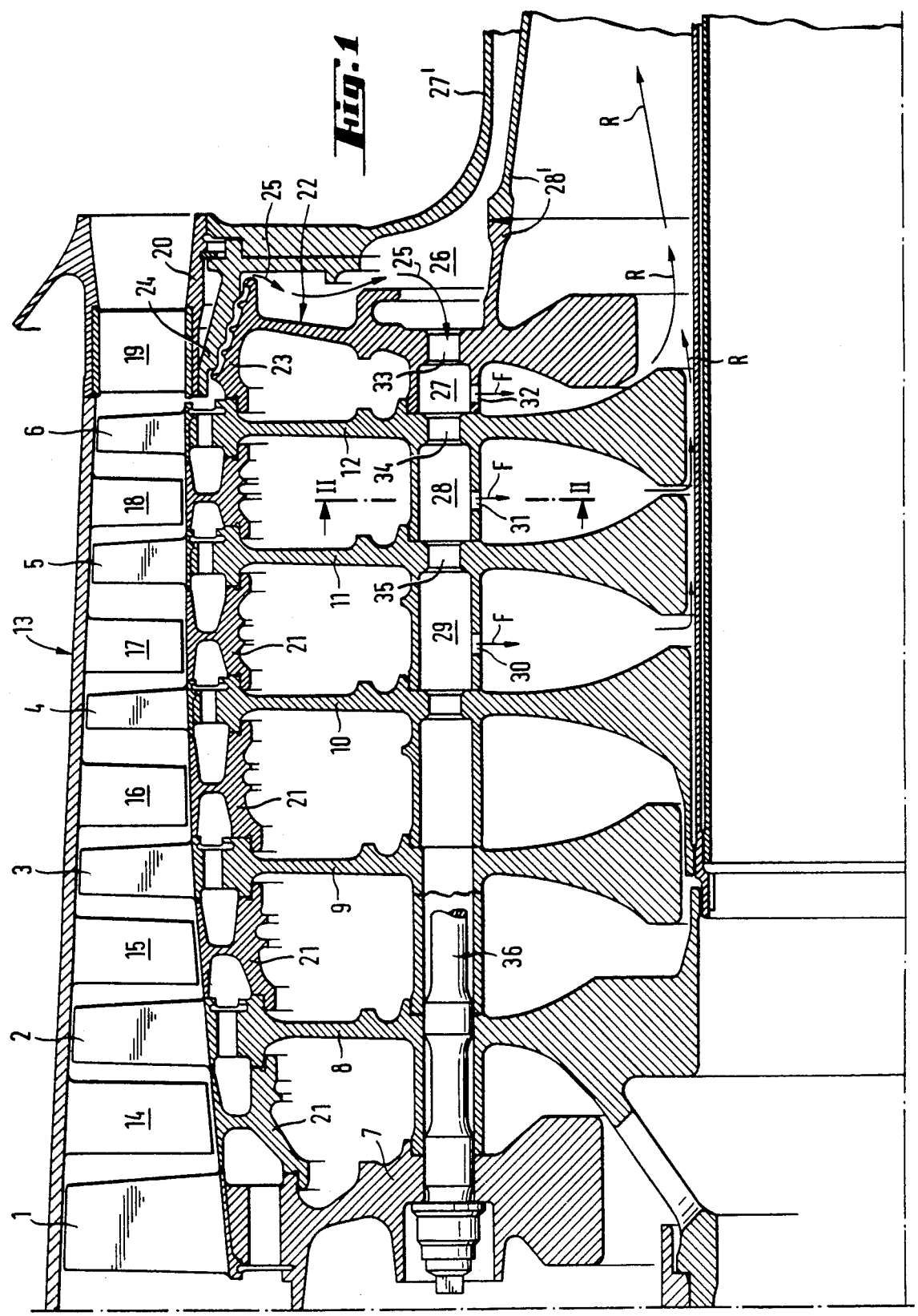
FIG. 1 is a longitudinal section through a high-pressure axial compressor of the gas generator of a jet engine including the construction of the invention.

FIG. 1 shows an axial compressor of a gas turbine engine, the compressor comprising a rotor including a plurality of axially spaced rotor blades 1–6 secured to respective axially spaced rotor discs 7–12. Interposed in alternation between respective spaced rotor blades are guide blades 14–19. The guide blades are secured to an outer casing 13 of the compressor.

The last guide blade 19 is not only secured to the outer casing 13 but also to an inner stator structure 20 which forms a continuation of an inner wall of a flow channel of the compressor through which the main stream of air is conveyed and compressed. In the region of the outer periphery of the rotor, the individual axial spaces between the rotor discs 7–12 are bridged over by intermediate rings 21. The rings 21 form part of the inner wall of the flow channel of the compressor by extending between the individual base plates of the rotor blades and the rings 21 face corresponding guide blades 14–18. A radial slot is formed between each of the fixed guide blades 14–18 and the respective ring 21 on the rotor which it faces.

The last rotor disc 22 supports a labyrinth-like sealing comb 23 which cooperates with a mating stator sealing element 24 to form a main seal of the compressor. A relatively hot stream of air is tapped off from between the rotor blades 6 and the guide blades 19 of the last compressor stage and flows into the seal formed by comb 23 and element 24. The seal is intended to oppose outflow of compressed air but nevertheless a leakage flow of the tapped off hot stream flows into an annular channel 26 after completing the sealing process of the main seal of the compressor. The annular channel 26 is essentially formed between an outer housing wall 27' of an adjacent combustion chamber (or a wall adjacent the latter) and an inner wall section 28' of a drum of the gas generator, on one side and rotor disc 22 on the other side. Wall section 28' and disc 22 form an entrance section for conveyance of a secondary stream 25 of hot air directed from the annular channel 26 to individual annular chambers 27,28,29. The secondary stream 25 flows in a direction opposite the direction of flow of the air in the main flow channel of the compressor where the air undergoes its compression.

More specifically, as seen in FIG. 1, the stream of hot air 25 is fed, from right to left, to annular chambers 27,28,29, formed in axial spacer mountings of the discs 22, 12, 11 and then the air passes into the inside of the compressor rotor in the direction of arrows F. For this purpose, hot air discharge holes 30,31,32 are formed in the radially inner wall sections of the spacer mountings.

Figure 2:
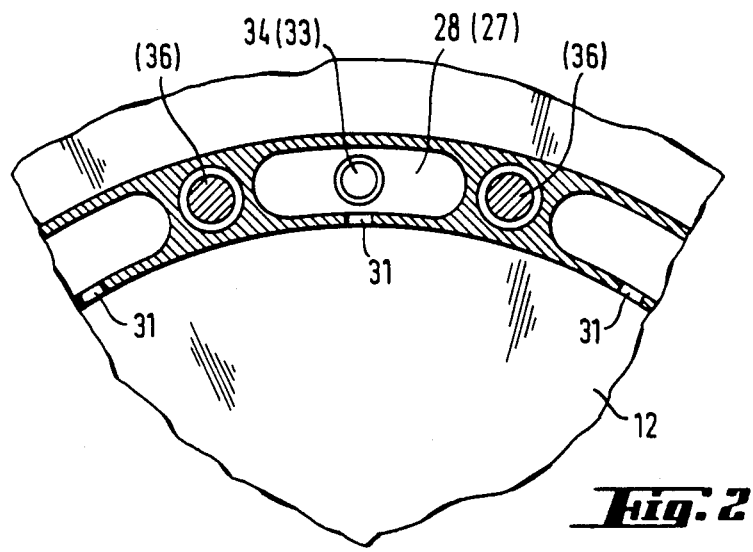
FIG. 2 is a sectional view taken along line II—II in FIG. 1.

By means of holes or openings 33,34,35 formed respectively in the supporting disc 22 and in the rotor discs 12,11,10, the hot air taken from the annular channel 26 can be fed to the annular chambers 27,28,29. In this respect, the openings 33,34,35 and the annular chambers 27,28,29 are arranged around a common, central axis of rotation. The annular chambers, for instance chambers 28 in FIG. 2, can be distributed uniformly over the periphery of the rotor.

In FIG. 1, is also seen a portion of one of several tie rods 36 which secure the individual rotor discs together axially.

Figure 4:
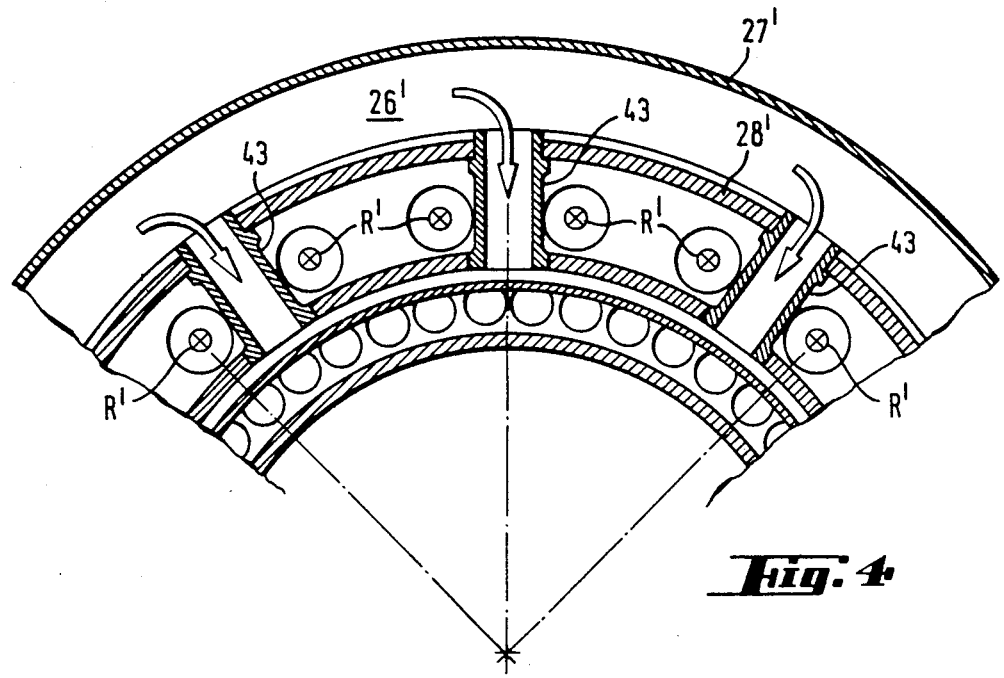
FIG. 4 is a sectional view taken along line IV—IV in FIG. 3.

In FIGS. 3 and 4, parts having functions comparable to those in FIG. 1 are designated by the same reference characters with primes.

In FIG. 3, the individual air streams F' derived from the leakage air flow 25' at the end of the compressor is fed, from a central hollow shaft 37 of the gas generator directly towards the root ends of the rotor discs, i.e. discs 22', 12', 11' respectively, into the interior of the compressor rotor such that the portions of the discs of greatest mass are intentionally traversed by the individual streams of hot air F'. In this regard, the root ends of the rotor discs are formed as free inner rods of the discs and these are aligned with holes 38,39,40 provided in the outer wall 41 of a double tube formed by inner and outer walls 41. The double tube is integrally secured in the rotor. Hot air tapped off from the compressor flows through an annular channel 42 enclosed by the walls 41 of the double tube in a direction opposite the main flow in the compressor and passes through the holes 38,39,40 as divided streams F'.

The annular channel 42 of the double tube is connected by pipes 43, isolated from the interior of the drum (see FIGS. 3 and 4), to a radially and axially extending annular channel 26' which is formed substantially between the housing wall 27' and one or more drum inner wall sections 28' of the gas generator. The hot air diverted from the leakage flow 25' is fed to annular channel 42 via pipes 43.

After the completion of the heating of the discs, the residual air stream R' can be used to particular advantage, for instance, for turbine cooling purposes since, due to the preceding removal of heat, the air has a substantially lower temperature than the temperature at the final stage of the compressor. This is also true of the air in stream R in FIG. 1.

By virtue of flowing the hot, compressed air, removed from the last disc of the compressor, against the regions of the discs of greatest mass, the discs can be substantially equalized in temperature therethroughout and the sizes of the rotor clearance slots and the sealing slots can be substantially preserved whereby the slots can be optimally designed.

Figure 5:
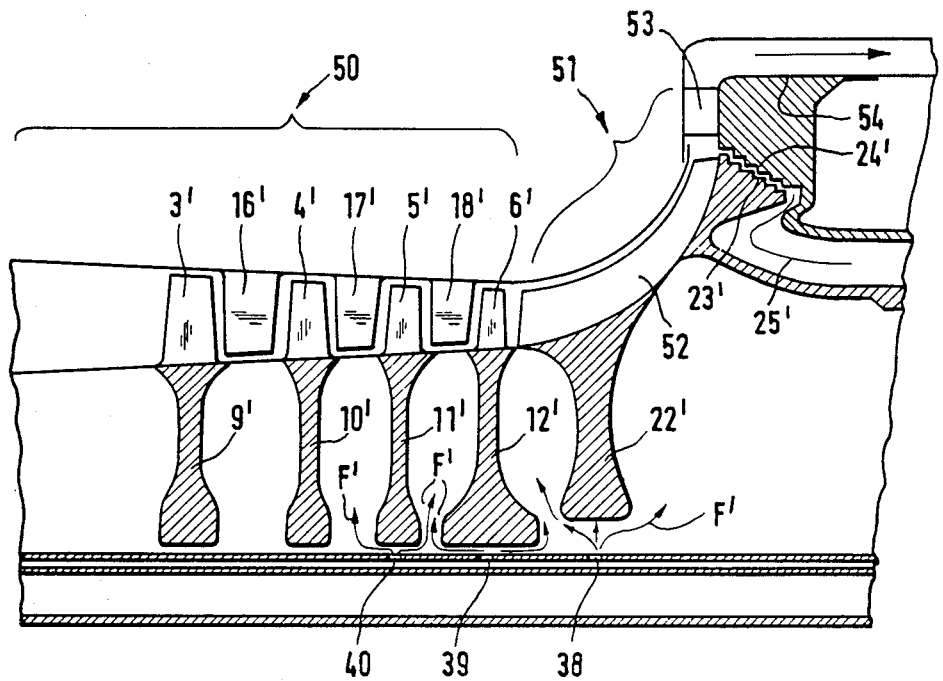
FIG. 5 is similar to FIG. 1 but for an axial-radial compressor and with a modified embodiment of the invention.

The subject matter of the invention can also be used to advantage, for instance in gas turbine engines with combined axial and radial compressors as will be seen from FIG. 5.

In this regard, FIG. 5 shows a modification of the construction in FIG. 3 in that the last rotor disc 22' supports radial compressor rotor blades 52 of a radial compressor 51 downstream of corresponding axial compressor 50. The radial compressor 51 contains diffuser guide blades 53 from which the compressed air flow from the compressor is fed to the combustion chamber of the gas turbine engine via an annular elbow pipe 54, which edflects the radial air flow into an axial flow.

In other respects, the compressor is substantially identical to the compressor in FIG. 3 and the elements of FIG. 5 which correspond to those of FIG. 3 are designated by the same reference characters.

From the above it is see that the invention provides a passive system which incorporates a minimum of structural elements and by which the diverted secondary stream from the leakage air is employed to heat at least the discs at the last stages to equalize the temperatures thereof therethroughout and bring them to the temperature of the stator structure so as to substantially preserve the optimum sizing of the blade and sealing slots. The passive system is also effective to respond to changing load conditions and varying input temperatures of the air.

Although the invention has been described in relation to specific embodiments thereof, it will become apparent to those skilled that numerous modifications and variations can be made within the scope and spirit of the invention as defined in the attached claims.

What is claimed is:

1. Apparatus for optimizing blade and sealing gaps of a multistage compressor of a gas turbine, said apparatus comprising a rotor having an axis of rotation and including a plurality of axially spaced discs and rotor blades on said discs, each disc including a root portion of greatest mass remote from its assorted blade, a stator casing surrounding, said rotor blades and forming clearance gaps therewith, said blades and stator casing forming a path for flow of air in a main stream in which the air is compressed in stages by said blades and discharged from the last stage of the compressor, main compressor sealing means at the last of the discs forming sealing gaps through which leakage air flows from the main stream, means for conveying said leakage air for discharge from the compressor towards the axis of rotation of said rotor, means for diverting a portion of said leakage air from said conveying means, as a secondary stream, in a direction opposite the main stream of air flow in the compressor towards the last rotor disc and at least the next adjacent rotor disc, means for dividing said secondary stream into a plurality of further streams respectively directed directly against said root portions of greatest mass of the last and next to last discs, and means for collecting the air after it has undergone flow on said root portions of greatest mass for discharge from the compressor, said plurality of further streams from said secondary stream causing heating of the root portions of greatest mass whereat the temperature is substantially equalized with the temperature at the periphery of said discs including said root portions of greatest mass.

2. Apparatus as claimed in claim 1 wherein said diverting means includes means for diverting said secondary stream from the leakage air and conveying said secondary stream radially inwardly of said rotor and then in said direction opposite the main stream of air flow in the compressor, said means for dividing said secondary stream into a plurality of further streams comprising means for discharging said further streams radially of said secondary stream as individual streams.

3. Apparatus as claimed in claim 2 wherein said further streams are individually and respectively directed against the root portion of greatest mass of the respective disc.

4. Apparatus as claimed in claim 1 wherein said means for dividing said secondary stream into a plurality of further streams comprises a central, hollow shaft of a gas generator within said rotor, the root ends of the discs being spaced from said shaft and forming inner free ends of said discs, said shaft having openings for flow of the further streams into the rotor against said root ends of said discs.

5. Apparatus as claimed in claim 4 wherein said hollow shaft includes inner and outer annular walls spaced from one another and defining an annular channel therebetween, said opeings being in said outer wall, said secondary stream flowing axially in said annular channel in a direction opposite the direction of flow of said main stream.

6. Apparatus as claimed in claim 5 wherein said means for diverting a portion of the leakage air further comprises pipes connecting said annular channel with the means which conveys the leakage air, said pipes being isolated from the interior of the rotor.

7. Apparatus as claimed in claim 6 wherein said means which diverts a portion of the leakage air as a secondary stream includes a further annular channel formed between a wall of a combustion chamber adjoining the compressor and a wall of a gas generator adjoining the compressor, the leakage air being supplied from said annular channel to said further annular channel and then to said pipes.

8. Apparatus as claimed in claim 7 wherein said further annular channel includes portions which extend radially and axially.

9. Apparatus as claimed in claim 1 wherein said rotor further includes hollow, axial spacer elements between adjacent discs forming respective annular chambers into which the secondary stream is introduced.

10. Apparatus as claimed in claim 9 wherein said discs are respectively provided with openings for passage of the secondary air into said respective annular chambers of said spacer elements.

11. Apparatus as claimed in claim 10 wherein said openings in the discs and said annular chambers are arranged around a common central axis of rotation.

12. Apparatus as claimed in claim 11 wherein said spacer elements have discharge holes in radially inwardly located walls thereof.

13. Apparatus as claimed in claim 9 wherein said means for diverting said secondary stream includes a further annular channel formed between a wall of a combustion chamber adjoining the compressor, a wall of a gas generator adjoining the compressor, and the last rotor disc of the compressor.

14. Apparatus as claimed in claim 1 wherein said last rotor disc of the compressor includes a support disc secured thereat and a seal member on said support disc, said compressor further comprising a stator structure facing said support disc and including a complementary seal member, said seal member and complementary seal member forming part of said sealing means.

15. Apparatus as claimed in claim 1 wherein the blade on the last disc extends in part radially and in part axially.

16. Apparatus as claimed in claim 1 comprising air discharge means and air flow passage means for flow of the discharged secondary air for further desired engine purposes.

* * * * *